Feb. 26, 1924
S. LEVITT
HOSE COUPLING
Filed Aug. 16, 1921
1,485,139
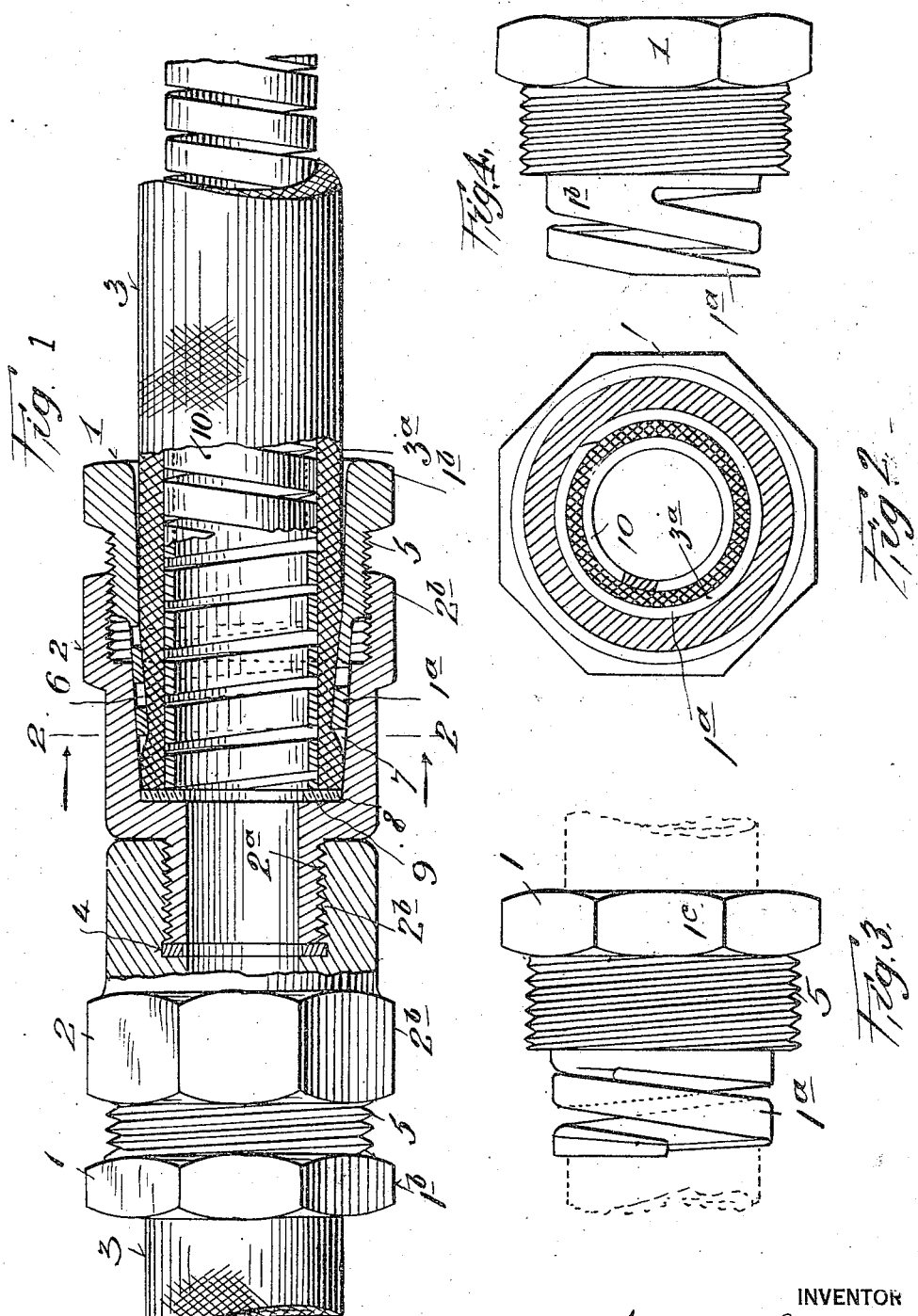
INVENTOR
Samuel Levitt
BY his ATTORNEY Patented Feb. 26, 1924.

1,485,139

UNITED STATES PATENT OFFICE.

SAMUEL LEVITT, OF BROOKLYN, NEW YORK, ASSIGNOR TO THE OKONITE COMPANY, OF PASSAIC, NEW JERSEY, A CORPORATION OF NEW JERSEY.

HOSE COUPLING.

Application filed August 16, 1921. Serial No. 492,655.

*To all whom it may concern:*

Be it known that I, SAMUEL LEVITT, a citizen of Russia, and resident of New York city, borough of Brooklyn, in the county of Kings and State of New York, have invented certain new and useful Improvements in Hose Couplings, of which the following is a specification.

The object of my invention is to provide a hose coupling of such character that it may be securely attached to hose and be readily removed without injury to itself or to the hose, and wherein the hose gripping element is an integral part of one of the main coupling members so that said element and member will always remain united.

In carrying out my invention I provide a main coupling member having a pliable spiral hose-gripping element integral with said member to receive a hose, and another coupling member to compress the spiral member on the hose, with means cooperative between said members to detachably unite them and cause the second named member to force the spiral element against the hose.

My invention also comprises novel details of improvement that will be more fully hereinafter set forth, and then pointed out in the claims.

Reference is to be had to the accompanying drawings forming part hereof, wherein—

Figure 1 is a partly sectional side view illustrating my improved coupling upon a hose; Fig. 2 is a cross section on line 2, 2 in Fig. 1; and Figs. 3 and 4 are details of the main coupling member, looking from opposite sides thereof.

Similar numerals of reference indicate corresponding parts in the several views.

The numerals 1, 2 indicate the main members of each coupling set which are hollow to receive hose 3. The members 1 and 2 for each hose end are correspondingly organized, except that one member 2 has a projecting portion provided with male threads $2^a$ to receive threads $2^b$ in the female portion of the other member 2 to couple said members together, preferably with a washer 4 therebetween. Member 1 is provided at one end with a hollow projecting spiral element in the form of a thread $1^a$ to receive the end portion of the hose. The member 1 and its thread-like element $1^a$ are cast in a single piece of metal, which may be of relatively pliable brass or so-called composition, so that the element $1^a$ may be squeezed or compressed upon the hose. As illustrated in Fig. 4, the thread-like element $1^a$ extends from a base portion $1^b$ beyond the male threads 5 on member 1. The member 1 and its integral element $1^a$ are tubular throughout for the passage of the hose therethrough. The main member 2 is shown provided with a bore 6 having an inner outwardly tapering face 7 to fit against the exterior of spiral element $1^a$ to squeeze or force the latter against and slightly into the covering $3^a$ of hose 3, when the inner female threads 8 of member 2 are screwed on the threads 5 of member 1. The spiral of member 1 extends in such direction that when members 1 and 2 are screwed together the tendency will be to wind element $1^a$ tightly on the hose as well as to compress said element thereon. A washer 8 is shown between the end of the hose and the seat 9 at the inner end of bore 6 to prevent leakage. The hose is shown of the covered metal variety having the inner spiral metal winding 10 and the covering $3^a$ of rubber, fabric and the like customary in so-called flexible metal hose.

When the coupling members are to be applied to the hose the member 1 placed on the end of the hose, with its element $1^a$ terminating near the end of the hose, the parts preferably being rotated relatively to screw the spiral element $1^a$ on the hose, and the member 2 is screwed on member 1 so that the tapering face 7 will ride on element 1 and squeeze or compress the latter on the hose. So long as the parts are thus assembled the coupling members will remain securely attached to the hose without danger of being pulled off of the latter. When the male and female coupling members 1 and 2 are attached, as described, to the ends of two lengths of hose the members 2 may be coupled together to unit the ends of the hose, as shown in Fig. 1.

In accordance with my invention, by having the spiral pliable element $1^a$ integral with and at one end of member 1 said parts will remain united in use without danger of separation and serving to securely resist longitudinal stress on the hose. When the coupling members are to be disconnected from the hose the member 2 is unscrewed from member 1 and the latter may be unscrewed from the hose to relieve the gripping effect of the spiral thread-like element 1ª thereon, since, by reason of the pliability of said element, it is forced into the covering, in a thread-like way, when members 1 and 2 are screwed together.

The member 1 is shown with the nut-like part 1ᵇ at the end opposite element 1ª to receive a wrench, the member 2 likewise having flats 2ᵇ for a wrench.

My improvement is simple in construction, effective in use, not liable to damage or to get out of order, and cheap to manufacture.

Having now described my invention, what I claim is:—

1. A hose coupling comprising a member having a pliable spiral element integral therewith at one end and free at the outer end, another member to fit over said element to force it against a hose, and means to secure said members together.

2. A hose coupling comprising a member having a pliable spiral element integral therewith at one end and free at the outer end, another member to fit over said element and having a bore provided with a tapering face to force said element against a hose, and means to secure said members together.

3. A hose coupling comprising a member having an integral spiral pliable element at one end extending beyond the member, said member and element being tubular for the passage of a hose therethrough, another member having a bore provided with a tapering face to engage said element upon a hose, and means to detachably secure said members upon the hose.

4. A hose coupling comprising a conically recessed case member, a ferrule enclosing a hose end and entering said case member, and a pliable spiral element cooperating with said ferrule and adapted to be positively rotated and forced against the hose when the case member and ferrule are secured together.

Signed at New York city, in the county of New York, and State of New York, this 31st day of July, A. D. 1921.

SAMUEL LEVITT.